United States Patent
Schulz

[11] Patent Number: 6,070,688
[45] Date of Patent: Jun. 6, 2000

[54] SEMITRAILER WITH ANTI-THEFT PROTECTION

[76] Inventor: Gerd Schulz, Danziger Strasse 2, D-34289 Zierenberg, Germany

[21] Appl. No.: 09/051,433

[22] PCT Filed: Oct. 11, 1996

[86] PCT No.: PCT/EP96/04436

§ 371 Date: Apr. 13, 1998

§ 102(e) Date: Apr. 13, 1998

[87] PCT Pub. No.: WO97/14604

PCT Pub. Date: Apr. 24, 1997

[30] Foreign Application Priority Data

Oct. 14, 1995 [DE] Germany ............................. 195 38 306

[51] Int. Cl.[7] .................................................. B60R 25/00
[52] U.S. Cl. .............................. 180/287; 280/507; 70/232
[58] Field of Search ......................... 180/287; 280/507; 70/232, 14, 163, 166, 167, 168, 169; 292/240, 219, 220, 195

[56] References Cited

U.S. PATENT DOCUMENTS

| | | |
|---|---|---|
| 2,554,306 | 5/1951 | Marc ........................................ 280/507 |
| 3,112,636 | 12/1963 | McIntyre ................................... 280/507 |
| 3,386,274 | 6/1968 | McIntyre ................................... 280/507 |
| 3,415,085 | 12/1968 | Eble, Jr. .................................... 280/507 |
| 3,600,914 | 8/1971 | Johnson ..................................... 70/232 |
| 3,706,211 | 12/1972 | Owen ........................................ 70/232 |
| 3,798,938 | 3/1974 | McCullum ................................. 70/232 |
| 3,832,872 | 9/1974 | Gerlach ..................................... 70/232 |
| 3,922,897 | 12/1975 | Mickelson ................................. 70/232 |
| 4,126,330 | 11/1978 | Poole ........................................ 280/507 |
| 4,132,093 | 1/1979 | McDorman, Sr. .......................... 70/232 |
| 4,614,357 | 9/1986 | Murray ...................................... 280/507 |
| 4,721,324 | 1/1988 | Blacklaw ................................... 280/507 |
| 5,172,944 | 12/1992 | Munich et al. ............................ 292/240 |

*Primary Examiner*—Daniel G. DePumpo
*Assistant Examiner*—Andrew J. Fischer
*Attorney, Agent, or Firm*—Michael J. Striker

[57] ABSTRACT

A semitrailer (1) with anti-theft protection, which prevents the parked semitrailer (1) from being hitched to a tractor-trailer (2) by unauthorized persons, has a latching device (7) with a securing element (8), which element can be moved by an actuating means (9) into the region of a coupling pin (4) and blocks the sliding of the fifth wheel coupling pin (4) into a fifth wheel (3).

13 Claims, 2 Drawing Sheets

SEMITRAILER WITH ANTI-THEFT PROTECTION

BACKGROUND OF THE INVENTION

The invention relates to a semitrailer with anti-theft protection, which prevents the parked semitrailer from being hitched to a tractor-trailer by unauthorized persons.

It is known for semitrailers to be equipped with an anti-theft protection, which prevents the temporarily parked semitrailer from being stolen by unauthorized persons whose have a tractor-trailer. Semitrailers, also known as container chassis, are provided, in the front area of the chassis, with a fifth wheel coupling pin also known as a kingpin, particularly in accordance with DIN Standard 74080 or ISO Standard 337. With such an arrangement, via a tractor-trailer equipped with a fifth wheel, in particular in accordance with DIN Standard 74081, the semitrailer easily be picked up and transported on public roads. Anti-theft protection arrangements of known design cylindrically encompass the fifth wheel coupling pin and are secured against being stolen with a cylinder lock. The encompassed fifth wheel coupling pin can not longer be introduced into the fifth wheel.

The known anti-theft protection arrangements have the disadvantage that the driver must manually secure and lock the securing unit to the fifth wheel coupling pin. The attachment is done from below in an inconvenient posture, and the securing unit as well as hands or gloves become soiled with grease and road dirt. This is true particularly when the securing unit is attached during darkness. Moreover, the securing unit soils the place where it is stored when not in use. After use, the soil can be removed only at considerable effort. This process is so burdensome to the driver that in many cases he will not bother to attach the securing unit.

SUMMARY OF THE INVENTION

The object of the invention is to disclose a semitrailer with an anti-theft protection that is simple and convenient to actuate.

The object is attained according to the invention in that the semitrailer has a latching device with a securing element, which element is movable by an actuating means into the region of a fifth wheel coupling pin and which, in a latching position, prevents the fifth wheel coupling pin from sliding into a fifth wheel. The subject of the invention has the advantage that the latching device is permanently installed on the semitrailer and need merely be actuated by the driver. The actuating means for the securing element makes the actuation of the latching device by the driver convenient and simple, and the driver need not crawl under the semitrailer. Because it is easy to operate, the driver will effortlessly actuate the latching device when needed at all times, so that the semitrailer will never be parked unsecured when not in use.

In a preferred embodiment it is provided that the actuating means is automatically activated each time the trailer is uncoupled from the tractor-trailer and immediately puts the securing element into the latching position. This has the advantage that the driver need not first actively actuate the latching device for locking up. As a result, locking up becomes still more convenient and can no longer be forgotten.

In a simple embodiment it is provided that the securing element is pivotably secured and can be pivoted by the actuating means into a latching position in the region of the fifth wheel coupling pin. This arrangement requires only slight engineering expense, particularly in view of the actuating means.

A further embodiment provides that the securing element is disposed behind a fifth wheel carrying the coupling pin and can be pivoted downward out into the latching position through an opening of the fifth wheel cradle. In the latching position, the securing element plunges into the region of the coupling pin below the fifth wheel cradle, where it effectively prevents coupling of a fifth wheel to the coupling pin. In the release position, the securing element is pivoted upward and disappears behind the fifth wheel cradle into the interior of the semitrailer, where on the one hand it is no hindrance and on the other it is protected against soiling and damage.

In a further feature of the invention, an energy-storing spring prestressed in the latching direction of the securing element and actuatable in the release direction by means of a pneumatic piston-cylinder unit, is provided as the actuating means. Pneumatic actuation is especially recommended, since the semitrailer is already equipped with a compressed-air system for the brakes. The energy-storing spring stores the energy needed for actuating the latching device, so that the anti-theft protection can be activated even without air pressure.

The invention is improved still further by the provision that when the motor vehicle is uncoupled, the energy-storing spring is automatically tripped and the securing element is put into the latching position. Thus the activation of the anti-theft protection is always assured in a simple way and can no longer be forgotten by the driver. For instance, the anti-theft protection can be actuated by uncoupling the compressed air hoses or electric lines or by uncoupling the fifth wheel coupling pin.

In a feature of the invention, the securing element is embodied as a securing wedge, in which at least one portion that can be pivoted outward and downward through the opening (13) is substantially wedge-shaped. This form, with its substantially vertical end face, especially effectively keeps an approaching fifth wheel back and on the other hand does not block an already hitched fifth wheel if the latching device is actuated by mistake after the hitching is done.

However, the securing wedge may also be disposed other than what is shown in FIGS. 1–3, in such a way that its end face is toward the fifth wheel coupling pin. In that case, an approaching fifth wheel would slide along the oblique ramp face of the securing wedge; the semitrailer would be lifted and thus the coupling pin would be moved upward out of range of the fifth wheel. In this mode of operation it is understood that other profile forms can also be considered for the securing wedge, forms that in the strict sense are not wedgelike but instead merely have a ramp face, which may for instance be curved and in particular may be in the form of part of a circle.

In order especially effectively to prevent the securing wedge from being pushed back out of the latching position by force by unauthorized persons, the securing wedge can be locked in the latching position by a pivotable locking bar.

In a preferred embodiment, the pivotable locking bar is disposed hanging substantially downward from a pivot bearing and for locking can be pivoted in the direction of the securing wedge, so that the pivotable end of the locking bar moves at least partway across the backside of the securing wedge which has pivoted downward into the latching position. If an attempt is made to push the securing wedge backward forcefully out of the latching position, the securing wedge presses against the locking bar, and the force exerted on the locking bar pulls directly from the contact point onto the pivot bearing of the locking bar. The result is essentially no torque that could twist the locking bar out of the locking position.

The arrangement can be still further improved by the provision that a rotatably disposed blocking element is provided, which upon rotating, in the manner of a cam disk, pivots the locking bar and blocks it in the locking position. By the embodiment of the cam disk profile, a variable lever reduction can be achieved, so that as the rotational angle of the blocking element increases, the motion of the locking bar becomes smaller and smaller, and the force exerted on it becomes greater and greater. In the locking position of the locking bar and the blocking position of the blocking element, in turn, the force exerted from the contact point between the blocking element and the locking bar is exerted in turn directly on the pivot bearing of the blocking element, so that essentially no torque is generated.

In a preferred embodiment it is provided that the blocking element is rotatable by means of a second actuating means. In this way, the blocking element can be actuated by remote control just like the securing wedge.

The arrangement is still further improved by providing that as the second actuating means, a second energy-storing spring prestressed in the blocking direction of the blocking element and actuatable counter to the blocking direction by means of a pneumatic piston-cylinder unit, is provided. Once again, the energy for actuating the blocking element can be stored in the energy-storing spring, so that if the compressed air supply fails, secure and reliable blocking is assured.

A further feature of the invention provides that the securing wedge has a recess, into which the pivotable locking bar can be pivoted in the release position of the securing wedge, so as to lock the securing wedge in its release position as well. This provision enables dual utilization of the function of the locking bar, and it dispenses with an additional locking device for locking the securing wedge in its release position.

To prevent the anti-theft protection from being manipulated by unauthorized persons, it is provided that the latching device, with all its components for actuating, securing, locking and blocking, is disposed inaccessibly in a housing.

A further improvement is attained in that the housing is welded shut after the latching device has been installed. A semitrailer secured in this way can be stolen—if at all—only by using a welding tool.

In a preferred embodiment of the invention, a control system for coordinated control of the components of the latching device is provided, in order to put the latching device in the latching position or to unlatch it. A control system of this kind can be used for instance for coordinated actuation of the pneumatic energy-storing springs. In that case, to release the securing wedge, first the blocking element would have to be moved out of the blocking position by means of the second energy-storing spring, whereupon the locking bar moves out of its locking position. After that, the first energy-storing spring would have to be pneumatically tensed, to put the securing wedge in the release position. Finally, the air pressure at the second energy-storing spring cylinder must be rescinded, so that the energy-storing spring assumes the blocking position and puts the locking bar back in the locking position.

It is especially advantageous if the control system includes pneumatic electrical and manual actuating and control means. For actuating the securing wedge and the blocking element, not only the pneumatic actuating means already mentioned but also electrical or manual actuating means can be used. Electric control means may for instance comprise program control or electrical actuation of pneumatic valves. A manual control means may in particular comprise a key-actuated lock, which in turn acts on the latching device via electrical or pneumatic control means.

If the control system is built into the semitrailer, it is recommended that the control system is activatable only via a key, a code, or radio. Each of the characteristics recited contribute individually or in combination to the anti-theft protection of the semitrailer.

Further advantages and details of the invention will become apparent from the ensuing description of an exemplary embodiment, in conjunction with the drawing.

DESCRIPTION OF PREFERRED EMBODIMENTS

Figure 4:
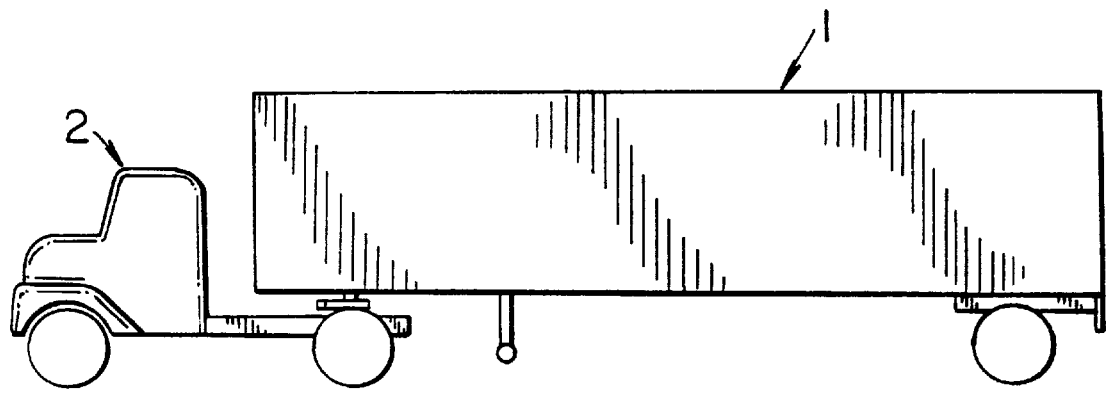
Figure 5:
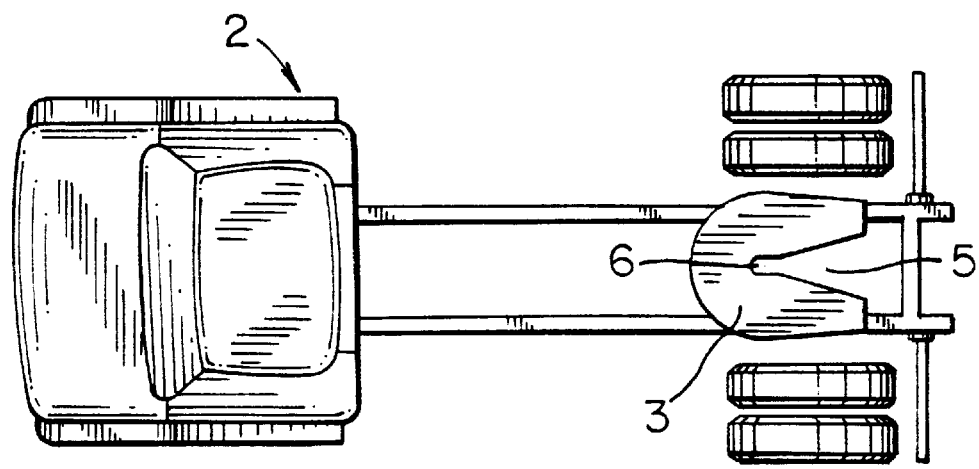

In FIG. 4, a semitrailer 1 is seen that is hitched to a tractor-trailer 2. One such tractor-trailer 2 is also shown in FIG. 5. It has a fifth wheel 3, which for hitching is driven underneath the semitrailer 1. Then a fifth wheel coupling pin 4 (FIG. 1) is guided into an opening 5 in the fifth wheel 3, so that it slides into the fifth wheel 3 and can be arrested in a terminal position 6.

Figure 1:
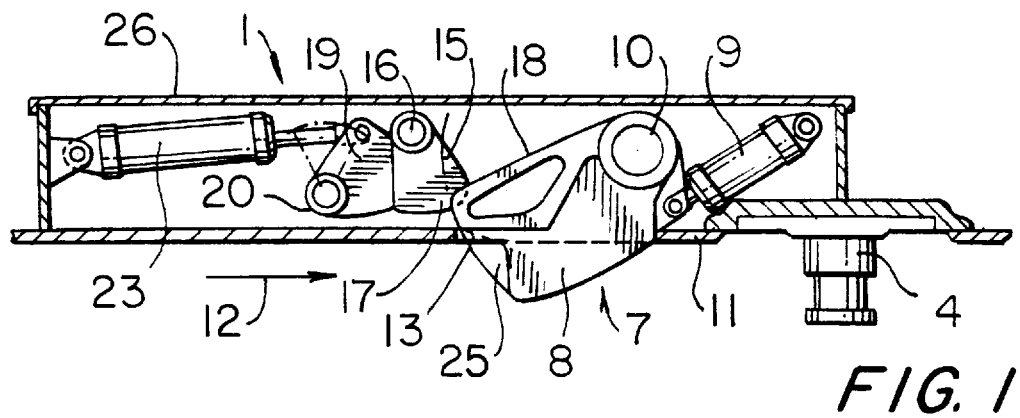
FIG. 1: a partly cutaway fragmentary view of a semitrailer with a latching device according to the invention in the blocked latching position.
Figure 2:
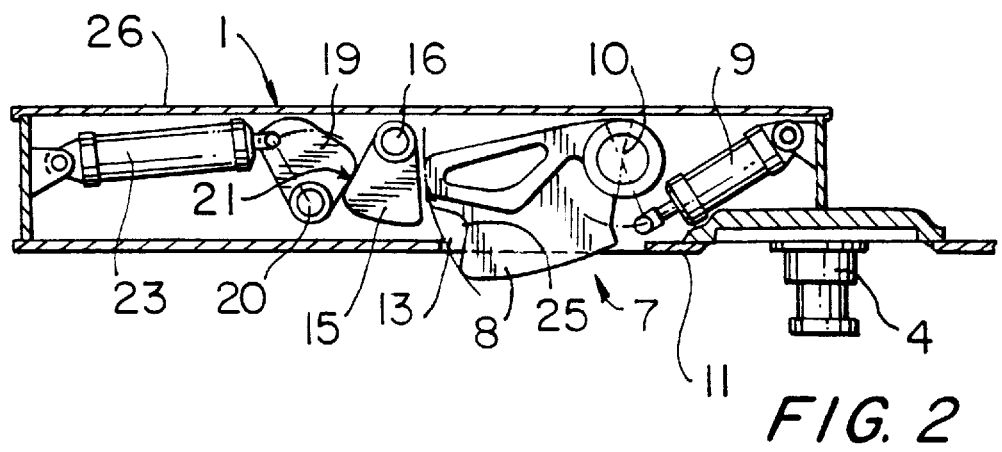
FIG. 2: the latching device of FIG. 1 in a transitional position during the actuation.
Figure 3:
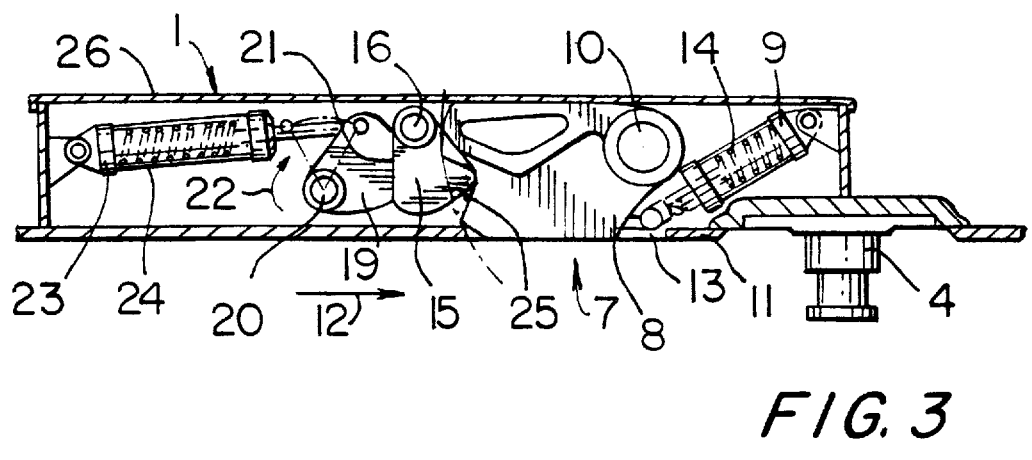
FIG. 3: the same latching device in the blocked release position.

As best seen in FIGS. 1–3, the semitrailer 1 is provided with a latching device 7, which prevents the parked semitrailer 1 from being hitched to a tractor-trailer 2 by unauthorized persons. The latching device 7 has a securing element in the form of a securing wedge 8, which can be pivoted into the range of the coupling pin 4 by means of a first actuating means embodied as an energy-storing spring 9. The securing wedge 8 is pivotably secured to a pivot bearing 10 and can be pivoted by the energy-storing spring 9 out of a release position shown in FIG. 3 into a latching position shown in FIG. 1.

In the release position, the securing wedge 8 is located behind a fifth wheel cradle 11 that carries the coupling pin 4, so that the region around the coupling pin 4 remains freely accessible. In this release position, a tractor-trailer 2 with its fifth wheel 3 can drive in the direction of the arrow 12 and the semitrailer 1, and in the process the coupling pin 4 slides into the fifth wheel 3.

In the fifth wheel cradle 11, an opening 13 is provided, through which the securing wedge 8 can be pivoted into the latching position. FIG. 1 shows this situation with the active anti-theft protection, in which the securing wedge 8, in its latching position, prevents any approach of a fifth wheel 3 to the coupling pin 4, especially from the direction indicated by the arrow 12.

The energy-storing spring 9 is prestressed by a spring 14 in the latching direction of the securing wedge 8, so that in the unactuated state it always pulls the securing wedge 8 in the latching direction. The energy-storing spring 9 also has a pneumatic piston-cylinder unit, not shown, which upon imposition with the air pressure of a compressed air system pushes the securing wedge 8 in the release direction, counter to the tension of the spring 14. Such an arrangement with the energy-storing spring 9 is especially suitable for automatic tripping of the latching device 7 when the tractor-trailer 2 is uncoupled. With the aid of the energy stored in the energy-storing spring 9, it is always possible, even without connecting the semitrailer 1 to the supply of the tractor-trailer 2, to put the securing wedge 8 in the latching position.

The latching device 7 also includes a locking bar 15, which is disposed pivotably, hanging downward, in a pivot bearing 16 and is used to lock the securing wedge 8. To that end, the locking bar 15 is pivoted in the direction of the securing wedge 8, so that the pivotable end 17 of the locking bar 15 moves partway part the back side of the 18 of the securing wedge 8 that has been pivoted downward into the latching position.

The latching device 7 also includes a blocking element 19, which is pivotably supported in a pivot bearing 20. The blocking element 19 serves to swivel and block the locking bar 15; an outer edge 21 of the blocking element 19 acts in the manner of a cam disk on the locking bar 15, so that upon rotation of the blocking element 19 in the direction of rotation 22, it puts the locking bar 15 out of the position shown in FIG. 2 and into the locking position shown in FIG. 3. In the locking position, the locking bar 15 is blocked by the blocking element 19.

The blocking element 19 is rotated by an energy-storing spring 23, which acts as the second actuating means. The energy-storing spring 23 is prestressed by a spring 24 in the blocking direction (equivalent to the direction of rotation 22) of the blocking element 19, so that without further actuation, it automatically puts the blocking element 19 in the blocking position and firmly keeps it there by means of the energy stored in the spring 24.

The energy-storing spring 23 also has a pneumatic piston-cylinder unit, not shown, which for actuation of the energy-storing spring 23 counter to the force of the spring 24, that is, counter to the blocking direction of the blocking element 19, can be actuated by imposition of the pressure of a compressed air system.

The securing wedge 8 has a recess 25, into which the pivotable locking bar 15, in the release position (FIG. 3) of the securing wedge 8, can be pivoted in order to lock the securing wedge 8 in its release position as well.

The entire latching device 7, with all its components 8, 9, 15, 19, 23 for actuating, securing, locking and blocking, is disposed inaccessibly in a housing 26. The housing 26 protects the latching device 7 against manipulation by unauthorized persons. Once the latching device 7 has been installed, the housing 26 is welded shut, to make access by unauthorized persons even more difficult.

List of Reference Numerals

1 Semitrailer
2 Tractor-trailer
3 Fifth wheel
4 Fifth wheel coupling pin
5 Opening
6 Terminal position
7 Latching device
8 Securing wedge
9 Energy-storing spring
10 Pivot bearing
11 Fifth wheel cradle
12 Arrow
13 Opening
14 Spring
15 Locking bar
16 Pivot bearing
17 End
18 Back side
19 Blocking element
20 Pivot bearing
21 Outer edge
22 Direction of rotation
23 Energy-storing spring
24 Spring
25 Recess
26 Housing

I claim:

1. A semitrailer with anti-theft protection, which prevents the parked semitrailer (1) from being hitched to a tractor-trailer (2) by unauthorized persons, characterized in that the semitrailer (1) has a latching device (7) with a securing element (8), which element is movable by an actuating means (9) into the region of a fifth wheel coupling pin (4) and which, in a latching position, prevents the fifth wheel coupling pin (4) from sliding into a fifth wheel (3); and the securing element (8) is pivotably secured and can be pivoted by the actuating means (9) into a latching position in the region of the fifth wheel coupling pin (4).

2. The semitrailer of claim 1, characterized in that the actuating means (9) is automatically activated each time the trailer is uncoupled from the tractor-trailer (2) and immediately puts the securing element (8) into the latching position.

3. The semitrailer of claim 1, characterized in that the securing element (8) is disposed behind a fifth wheel (11) carrying the coupling pin (4) and can be pivoted downward out into the latching position through an opening (13) of the fifth wheel cradle (11).

4. The semitrailer of claim 1, characterized in that when the tractor-trailer (2) is uncoupled, the energy-storing spring (9) is automatically tripped and the securing element (8) is put into the latching position.

5. The semitrailer of one of claim 1, characterized in that the securing element is embodied as a securing wedge (8), in which at least one portion that can be pivoted outward and downward through an opening (13) is substantially wedge-shaped.

6. The semitrailer of claim 1, characterized in that the latching device (7) is disposed inaccessibly in a housing (26).

7. The semitrailer of claim 6, characterized in that the housing (26) is welded shut after the latching device (7) has been installed.

8. A semitrailer with anti-theft protection, which prevents the parked semitrailer (1) from being hitched to a tractor-trailer (2) by unauthorized persons, characterized in that the semitrailer (1) has a latching device (7) with a securing element (8), which element is movable by an actuating means (9) into the region of a fifth wheel coupling pin (4) and which, in a latching position, prevents the fifth wheel coupling pin (4) from sliding into a fifth wheel (3), the securing element is embodied as a securing wedge (8) in which at least one portion that can be pivoted outward and downward through an opening (13) is substantially wedge-shaped; and the securing wedge (8) can be locked in the latching position by a pivotable locking bar (1).

9. The semitrailer of claim 8, characterized in that the pivotable locking bar (15) is disposed hanging substantially downward from a pivot bearing (16) and for locking can be pivoted in the direction of the securing wedge (8), so that the pivotable end (17) of the locking bar (15) moves at least partway across the backside (18) of the securing wedge (8) which has pivoted downward into the latching position.

10. The semitrailer of claim 8, characterized in that a rotatably disposed blocking element (19) is provided, which upon rotating, in the manner of a cam disk, pivots the locking bar (15) and blocks it in the locking position.

11. The semitrailer of claim 10, characterized in that the blocking element (19) is rotatable by means of a second actuating means (23).

12. The semitrailer of claim 11, characterized in that as the second actuating means, a second energy-storing spring (23) prestressed in the blocking direction of the blocking element (19) and actuatable counter to the blocking direction by means of a pneumatic piston-cylinder unit, is provided.

13. The semitrailer of claim 10, characterized in that the securing wedge (8) has a recess (25), into which the pivotable locking bar (15) can be pivoted in the release position of the securing wedge (8), so as to lock the securing wedge (8) in its release position as well.

\* \* \* \* \*